United States Patent [19]

Henbest et al.

[11] 4,202,959

[45] May 13, 1980

[54] SULFITE-MODIFIED FIBROUS RESINOUS MATERIAL

[75] Inventors: Richard G. C. Henbest; Kenneth McGregor, both of Stockton-on-Tees, England

[73] Assignee: Imperial Chemical Industries Limited, England

[21] Appl. No.: 857,972

[22] Filed: Dec. 5, 1977

[30] Foreign Application Priority Data

Dec. 8, 1976 [GB] United Kingdom ............... 51199/76

[51] Int. Cl.² .................... B32B 27/02; B32B 27/42; C08G 12/12; C08G 12/32
[52] U.S. Cl. .................... 528/254; 162/146; 162/157 R; 260/29.4 R; 264/176 F; 428/401; 528/129; 528/158; 528/244; 528/261; 528/265; 525/504; 525/505; 525/506; 525/508; 525/509
[58] Field of Search .............. 260/59 R, 57 A, 57 R, 260/57 C, 71, 69 R, 67.6 R; 264/176 F; 428/243, 231, 265, 401; 528/254, 261, 265

[56] References Cited

U.S. PATENT DOCUMENTS

| | | |
|---|---|---|
| 2,407,599 | 9/1946 | Auten et al. .............. 260/29.4 R |
| 2,412,855 | 12/1946 | Auten et al. .............. 528/254 X |
| 2,603,623 | 7/1952 | Bonzagni .................. 528/231 |
| 2,863,842 | 12/1958 | Bonzagni .................. 528/231 X |
| 2,949,396 | 8/1960 | Bonzagni .................. 528/254 X |
| 3,650,102 | 3/1972 | Economy et al. .......... 260/57 A |
| 3,651,199 | 3/1972 | Blume et al. .............. 260/59 R X |
| 3,661,829 | 5/1972 | Aignesberger et al. ..... 528/254 X |
| 3,848,044 | 11/1974 | Hagiwara et al. .......... 260/59 R X |
| 3,870,671 | 3/1975 | Aignesberger et al. ..... 528/254 X |
| 3,884,754 | 5/1975 | Kimura et al. .............. 264/176 F X |
| 3,941,734 | 2/1976 | Aignesberger et al. ..... 528/254 X |
| 3,961,123 | 6/1976 | Ohtomo .................... 260/59 R X |
| 4,076,692 | 2/1978 | Batha et al. ............... 260/59 R |
| 4,088,620 | 5/1978 | Nihongi et al. ............ 264/176 F |
| 4,145,371 | 3/1979 | Tohyama et al. .......... 264/176 F X |

FOREIGN PATENT DOCUMENTS

| | | |
|---|---|---|
| 48-33763 | 10/1973 | Japan . |
| 572962 | 10/1945 | United Kingdom ......... 162/146 |
| 1141207 | 1/1969 | United Kingdom . |
| 1420838 | 1/1976 | United Kingdom . |

OTHER PUBLICATIONS

Chem. Abstracts, vol. 81, 1974, 14600e, Kohsakai.
Chem. Abstracts, vol. 82, 1975, 113089x, 172458q, Nihongi et al.
Chem. Abstracts, vol. 85, 1976 (effective date 4/30/76), Nihongi et al., 64666j.
Chem. Abstracts, vol. 83, 1975, 165669b, Koyama.
Chem. Abstracts, vol. 83, 1975, 116741k, Shiotani et al.

*Primary Examiner*—Howard E. Schain
*Attorney, Agent, or Firm*—Cushman, Darby & Cushman

[57] ABSTRACT

The present invention provides fibres of urea formaldehyde, melamine formaldehyde, phenol formaldehyde, and mixtures thereof, modified by inorganic oxyacid radicals derived from inorganic oxyacids of sulphur, salts of such inorganic oxyacids, phosphate radicals, phosphite radicals, borate radicals and mixtures thereof.

1 Claim, No Drawings

SULFITE-MODIFIED FIBROUS RESINOUS MATERIAL

This invention relates to a resinous material and in particular to a formaldehyde resin such as UF, MF or PF in fibre form and containing inorganic oxyacid radicals. It relates also to the manufacture of fibrous sheet material, in particular paper, containing such material in fibre form.

Such a resin in fibre form and containing inorganic oxyacid radicals is believed to be a new article of manufacture. It preferably comprises or consists of a urea-formaldehyde resin. The inorganic oxyacid radicals are preferably derived from sulphur, which is capable of forming a great many oxyacids, and the radicals are conveniently the sulphite and/or sulphonic acid radicals. The proportion of such radicals is suitably in the range 0.2 to 15% by mols of $CH_2$ derived from formaldehyde.

The radical-containing resin fibre can be made by applying a suitable inorganic oxy compound to the fibres after they have been formed, especially before any curing or harding treatment. More conveniently the inorganic oxy compound is incorporated in the course of resin-formation, preferably at an early stage of incomplete condensation. The inorganic oxy compound may be added in the form of one or more inorganic oxyacids, as one or more salts thereof, particularly one or more acid salts thereof, or as a mixture of one or more inorganic oxyacids with one or more salts thereof. A suitable proportion of the radicals can be introduced by having present 0.5 to 20%, especially 1 to 10%, by weight of sodium sulphite and/or metabisulphite on the resin solids to be formed in the mixture, or equivalent proportions of other inorganic oxyacids and/or their compounds (for example, phosphate, phosphite, borate compounds). If desired, a formaldehyde bisulphite or sulphoxylate compound can be used. The resin-forming composition preferably contains sufficient acid, additional if necessary to the inorganic acid, to promote curing. For example, 0.2 to 5.0% w/w of formic acid or its equivalent is suitable; ammonium salts of phosphoric, sulphuric and formic acid, and aluminum sulphate, are also suitable.

The resin-forming composition is formed, while still flowable, into fibres. This can be suitably done by conventional spinning of a viscous resin syrup into hot air ("dry-spinning") or into an acid bath ("wet-spinning"). Alternatively it can be formed by passing a fine stream or series of drops into a flowing resin-gelling liquid or by gas-fibrillation (in particular air-fibrillation) by means of a co-current or transverse gas stream: the latter procedure constitutes a further feature of the invention. As a further alternative it can be spun by tack-spinning, by pulling a fiberisable material between two surfaces to which it adheres and subsequently severing the fibres from one or both of the surfaces. For example, as described in U.K. Pat. No. 1,141,207, the resin may be moved into contact with a pair of belt surfaces so as to deposit it therebetween, whereafter the surfaces of the belts are moved apart to form fibres and stretch them, and the fibres are detached and collected. In our U.K. patent application 43862-43863-43864/75 (corresponding to U.S. Ser. No.: 731,937) there is described a suitable tack-spinning process in which fiberisable material is interposed between a porous surface and a second surface, the surfaces are caused to diverge so as to string fibres between them, the fibres are stabilised or solidified at least in part by fluid directed into or through the fibre-forming area from the opposite side of the porous surface to that on which the fibres are formed, and the fibres are separated at least from the second surface.

After formation, the fibres are normally fully cured by heating at between 100° C. and 200° C. It is, however, within the scope of the invention to effect a partial cure at this stage, especially if the fibres are to be used in a process in which it is desirable that they should show chemical reactivity.

Fibres according to the invention are suitable for paper making, especially when their average diameter does not exceed 25 microns (1 micron is usually the smallest practicable diameter) and their average length is at least 1 mm, preferably over 2.5 mm. They can be the sole or major fibrous component or the paper or can be in blends (1–99% by weight) with other fibres such as formaldehyde resin fibres containing no inorganic oxyacid radicals and/or with cellulose fibres such as conventional paper pulp and/or rag stock and/or other synthetic polymer fibres and/or inorganic fibres. The fibres according to the invention adhere well to one another and also to other paper-making fibres. This makes possible a gradation of paper properties, from the low stiffness, high bulk papers when little or no fibre according to the invention is present, to stiff papers. A particularly useful paper contains 10–30% w/w of long fibre (over 2 mm) according to the invention with short-fibre (under 2 mm) mechanical cellulose pulp and optionally 5 to 20% w/w of oxyacid-free urea-formaldehyde resin fibre. When the paper contains cellulose fibre and 5 to 50% w/w of fibre according to the invention, its water-resistance (in which the sense of wet-strength or, depending on its composition, resistance to wetting) is usefully greater than that of a corresponding all-cellulose paper.

Paper containing fibre according to the invention can contain conventional fillers, sizing agents, colouring matters and can carry the usual coatings and be laminated with other sheet materials. Preferably such paper contains one or more multivalent cations for example of iron, zirconium, calcium or (especially) aluminium, at a concentration in the range 0.5 to 5.0% w/w calculated as equivalent aluminium sulphate on the fibres. Such cations are conveniently introduced as soluble salts in the paper-making pulp. Generally it appears that less sizing agent is needed using the fibres according to the invention than in all-cellulose papers.

The method of making such papers typically comprises mixing the fibres with water and any other ingredients as set out hereinbefore, bringing the mixture to a sufficiently homogeneous state for the grade of paper to be produced, forming the mixture into the shape required and removing water from the shape. The mixing, homogenisation and water-removal can be carried out in machinery as used for dealing with cellulose pulp. The paper shapes are normally heated at over 60° C. to remove water, and their cohesion can be improved, especially when an inorganic multivalent cation such as aluminium is present, by heating at over 90° C., for example 110°–140° C. If the paper is in sheet form, such heating can be carried out using the usual steam-heated calender rolls. The adhesion obtained between the fibres will often be improved by ensuring a good degree of compaction of the paper sheet, e.g. by rolling at the wet stage.

In the gas fibrillation process according to the invention a continuous stream of liquid resin (such as a UF syrup containing 50–80% w/w of solids in water) is directed into the path of transversely-flowing or co-currently-flowing gas. The gas may issue from a nozzle in the throat of which its velocity may be as high as sonic velocity. The gas flow is preferably about perpendicular to the resin flow. Suitably the gas is air.

By way of example, if the resin stream in the zone of gas impingement is 0.1 to 2.0 mm in diameter and the resin viscosity is 5–100 (preferably 10–50) poise, the thread splits into fine fibres of diameter in the range 2–30 microns. The nozzle should be as close to the resin stream as possible in order to maximise conversion to fibre. The fibre thickness is less the greater the air supply pressure and flow rate. Above a certain pressure, for a given resin characteristics and stream diameter, the fibres become not thinner but shorter. A suitable resin flow rate is 5–30 g/min with an air flow rate of 100–600 SCFH at their pressures of 10–80 psig. The air nozzle can be circular, rectangular, or of any shape that impinges upon the resin stream in a stable manner. It has been found that good quality fibre with the minimum amount of short results if the resin stream flows steadily and without breaking. A plurality of resin streams can be directed into a single gas flow.

The present invention accordingly provides a formaldehyde resin in fibre form and containing inorganic oxyacid radicals.

The invention also provides a formaldehyde resin in fibre form and containing inorganic oxyacid radicals, which comprises the steps of forming a concentrated flowable resin having a viscosity in the range 5 to 100 poise, comprising urea formaldehyde, melamine formaldehyde, and/or phenol formaldehyde, converting the concentrated flowable resin into fibres having therein or thereon inorganic oxyacid radicals, and curing the fibres.

The invention further provides fibrous material, in particular paper, whereof the fibres comprise a formaldehyde resin in fibres form and containing inorganic oxyacid radicals.

EXAMPLE 1

Resin preparation 3267 ml of formalin (36.5% HCHO, 6.5% $CH_3OH$) was adjusted to pH 7.2 with NaOH solution, and 1303 g of urea, 20 g of $Na_2SO_3.7H_2O$ and 186 g $Na_2S_2O_5$ were added (pH was then 9.1). The mixture was refluxed for 30 minutes, cooled to 70° C., acidified with formic acid to pH 4.8, and returned to reflux for one hour. It was brought to pH 5.8 by adding NaOH, cooled to 50° C., and finally adjusted to 7.25 by the addition of further NaOH. The mixture was concentrated by vacuum evaporation to give a resin solution of viscosity 21 poise at 29° C., and solids content about 75% w/w. This is suitable for conversion to fibres by any of the methods described hereinbefore.

EXAMPLE 2

Fibre formation by transverse air fibrillation (a) A UF resin, of F:U ratio 1.95 and solids content about 67% was adjusted to a viscosity of 22 poise at 23° C. by adding water and 2.5 g of a 40% w/w solution of diammonium hydrogen phosphate, as a curing agent, for every 200 g of resin. The final solids content was about 61% w/w This was forced by air pressure downwards through an orifice at a rate of 21 g/min and blown by a horizontal air jet from a rectangular nozzle (dimensions 1 mm × 8 mm), using an air pressure of 50 psig and a flow rate of 500 SCFH. This produced a fine fibre which was blown into a chamber heated to 50° C. The fibre was collected, further dried at 60° C. and cured by heating at 120° C. When dispersed and disintegrated in water as for paper-making, the fibres were 1–2 mm long and about 10 microns in mean diameter.

(b,c) Fibres were similarly produced from the sulphite-modified resin of Example 1 and from a blend of equal amounts of the sulphite-modified resin and the UF resin of F:U ratio 1.95 of paragraph (a).

(d) In a further experiment the resin of (a) was adjusted to a viscosity of 32 poise and discharged from an orifice at a rate of 12 g/min. A 40% solution of ammonium sulphate was continuously mixed into the system at a rate of 2.5 g of solution per 200 g or resin. The same air nozzle was used but at an air pressure of 30 psig (air rate 300 SCFH). A fibre was prepared which, when disintegrated and dispersed in water, was on average about 4 mm long and of diameter about 15 microns.

EXAMPLE 3

Paper preparation

Three UF fibres were used, each fibrillated according to the invention:

A as in paragraph a of Example 2 (sulphite-free);
B as in paragraph b of Example 2 (all sulphite-containing);
C as in paragraph c of Example 2 (blend of sulphite-free and sulphite-containing resins)

In addition the following cellulose fibres were used:
D bleached Kraft pulp, beaten to a Canadian Standard Freeness of about 400.

Each fibre was disintegrated in a standard manner using 2000 counter revolutions of a standard laboratory pulp disintegrator, then converted to paper of substance 100 g/m² on a standard pulp evaluation apparatus.

A paper made from fibre A could just be removed from the wire screen of the apparatus but fell apart on drying.

Papers made from B and C could be handled more easily and when dried on a heated drum at 120° C. cohered well together.

A paper was prepared from C using, in the paper-making mixture, 2% w/w of $Al_2(SO_4)_3$ based on the weight of fibre. This formed well on the wire, and was dried initially by pressing between absorbent sheets, and finally in an oven at 90° C. When tested it showed a burst index of 0.40 $KNg^{-1}$ (burst pressure in $KNm^{-2}$ divided by the substance in $gm^{-2}$).

A mixture of equal amounts of fibres B and D were formed into a series of papers; in some of the samples 2% w/w of $Al_2(SO_4)_3$ (based on the weight of fibre) was added during disintegration of of the pulp. Strong, stiff papers were obtained after drying. Those with $Al_2(SO_4)_3$ added were particularly stiff, especially when dried at 120° C. By comparison, blends of A and D were limp, and lost fibre easily when the surface was ribbed.

Papers prepared from blends of B and D were not readily wetted by water, whereas papers prepared from D alone absorbed a drop of water placed on the surface almost immediately.

EXAMPLE 4

A resin was prepared using the components described in Example 1. The acidic condensation stage was performed at a pH of 4.8 for 48 minutes and the final pH was 7.2. After vacuum concentration a resin of approximate solids content 80% and viscosity 45 poise at 23° C. was obtained.

A blend of equal parts of this resin with a conventional UF resin of F:U ratio 1.95:1, solids content 67% (as used in Example 2(a)) was fibrillated using the procedure of Example 2(a). Incorporated into the resin mixture before spinning was 1.25% of an aqueous solution of a catalyst. The catalyst solution, and the curing schedule after spinning, was varied as follows:

- E catalyst: 40% diammonium hydrogen phosphate curing time 4 hours at 120° C.
- F catalyst: 40% aluminum sulphate curing time 1 hour at 120° C.
- G catalyst: 40% formic acid curing time 7 hours at 120° C.

The fibres so produced were of mean diameter $10\mu$. They were broken down by using a laboratory disintegrator to a length of about 2 mm, and incorporated into papers (a) alone and (b) in admixture with a mechanically ground wood pulp, using the standard procedure for making and testing paper hand sheets. Aluminum sulphate (2% w/w on the fibre) was added. Burst indices were measured on the papers, which had a substance of about 60 g/m$^2$

| Fibre | % $^W$/W Mechanical Pulp | | | |
|---|---|---|---|---|
| | 0 | 50 | 80 | |
| E | 0.28 | 0.56 | 0.92 | Burst index |
| F | 0.17 | 0.75 | 0.88 | KNm$^{-2}$/gm$^{-2}$ |
| G | 0.12 | 0.38 | 0.67 | |

As a comparison, sheets of paper were made using fibres produced from a sulphate-free resin (see Example 2(a)) and mechanical wood pulp. Burst indices were as follows:

| % $^W$/W Mechanical Pulp | Burst Index |
|---|---|
| 50 | 0.35 |
| 80 | 0.63 |
| 100 | 0.82 |

The examples show the superiority of the fibres of the present invention over unmodified UF fibres, and that the fibres can be used to improve the burst index of machanical pulp.

EXAMPLE 5

The sulphite-modified resin as prepared in Example 4, and the unmodified resin as described in Example 2(a), were blended together in various proportions to produce a range of resins of different levels of sulphite-modification. These were adjusted to a viscosity of 30 poise and spun into fibre using the procedure of Example 2(d), except that the catalyst solution used was a 40% solution in water of diammonium hydrogen phosphate. Fibres of mean diameter $10\mu$ were produced. Papers were made as before from the fibres and from mixtures of the fibres with mechanical pulp. Aluminium sulphate, 2% w/w on the fibres, was added. The fibres and the properties of the papers are described below.

| FIBRES | |
|---|---|
| H | 5 parts sulphite resin : 95 parts UF resin (About 0.5% $SO_3^{2-}$, based on original weight of reactants) |
| I | 15 parts sulphite resin : 85 parts UF resin (About 1.5% $SO_3^{2-}$) |
| J | 25 parts sulphite resin : 75 parts UF resin (About 2.5% $SO_3^{2-}$) |
| K | 35 parts sulphite resin : 65 parts UF resin (About 3.5% $SO_3^{2-}$) |

| Paper Properties |
|---|
| 100% H : soft adhesion |
| 80% Mechanical pulp, 20% H : Burst Index 0.69 |
| 100% I : soft adhesion |
| 80% Mechanical pulp, 20% I : Burst Index 0.67 |
| 100% J : soft adhesion |
| 80% Mechanical pulp, 20% J : Burst Index 0.70 |
| 50% Mechanical Pulp, 50% J : Burst Index 0.41 |
| 100% K : firm adhesion |
| 80% Mechanical pulp, 20% K : Burst Index 0.79 |
| 50% Mechanical pulp, 50% K : Burst Index 0.47 |

EXAMPLE 6

A mixture of equal parts of a sulphite-containing resin and a conventional UF resin, as used in Example 4, was adjusted in viscosity to 35 poise. Fibres were prepared from this material by centrifugal spinning as described in our copending British patent application No. 10405/77. (Detailed conditions: 3" rotor, speed 4,500 rpm, flow rate of resin 60 mls/min, temperature of surrounding air 75° C.). Catalyst (1.25% of 40% diammonium sulphate) was fed into the resin, and mixed, via a static mixer, continuously as the resin was supplied to the spinning disc. Long fibres of diameter $12\mu$ (average) were produced. These were cured by heating at 120° C. for four hours, and broken to lengths less than 5 mm before use.

Paper hand sheets were prepared from the fibres incorporating with the disintegrated fibres in water various metallic salts (all at a level of 2% based on the amount of fibre). The papers were well compacted while wet, pressed according to the British standard procedure, and dried at 70° C. Burst Indices were measured as follows:

| Added Salt | Burst Index |
|---|---|
| $Al_2(SO_4)_3$ | 0.56 |
| Calcium formate | 0.28 |
| Ferric sulphate | 0.46 |
| Zinc nitrate | 0.27 |

EXAMPLE 7

A resin was prepared using the components of Example 1; the acidic condensation stage was performed at pH 4.9 for 38 minutes. Urea was added (208 parts) to bring the final F:U ratio to 1.72:1. This was blended with a conventional UF resin of solids content 67% and F:U ratio 1.7:1. The mixture was adjusted to a viscosity of 35 poise and centrifugally spun as in Example 6. The catalyst used was 6% of a 30% solution of diammonium hydrogen phosphate similar fibre were produced, and reduced to less than 6 mm in length after curing at 120° for 4 hours.

Some of the fibres were into made paper as described previously (Example 6) to yield a paper with a burst index of 0.51. The paper had considerable strength when wetted by water; a burst index of 0.15 was measured on the wet paper.

A blend of the fibres with an equal amount of mechanical pulp gave a paper with a burst index of 0.85.

Blends of the fibre with Kraft pulp were compared, as paper handsheets, with blends using unmodified UF fibres similarly produced.

Measured burst indices were as follows:

| Paper | Burst Index $(KNm^{-2}/gm^{-2})$ |
|---|---|
| 80% Kraft, 20% unmodified uF fibres | 3.36 |
| 90% Kraft, 10% unmodified UF fibres | 4.49 |
| 80% Kraft, 20% modified UF fibres, according to invention | 4.04 |
| 90% Kraft, 10% modified UF fibres, according to invention | 5.03 |

In a further experiment to illustrate the use of the fibres of the present invention, a paper was prepared using 30% of modified UF fibres, as prepared above, 20% of unmodified UF fibres, as used in the above experiment, and 50% groundwood pulp. An excellent paper sample of burst index 0.68 $KNm^{-2}/gm^{-2}$ was obtained.

EXAMPLE 8

650 parts by weight of formalin (36.4% formaldehyde, 5.7% methanol, acidity 0.16%) were mixed with 237 parts of urea (formaldehyde:urea ratio 2:1) and brought to pH 7 with caustic soda solution. 11.6 parts of $NaH_2PO_4.2H_2O$ were added and the mixture heated to 55° C., when further NaOH solution was added to bring the pH to 6.05. The mixture was refluxed for 30 minutes, acidified to pH 4.9 with formic acid solution and refluxed further for 50 minutes. The pH was then adjusted to 5.4 with caustic soda solution, cooled to 40° C. and neutralised to pH 7 with more NaOH solution. The resin was concentrated by heating under vacuum to remove 285 parts of distillate.

The resin was converted to fibres by using the centrifugal spinning technique described in Example 6, except that in this case the catalyst used was a 30% solution of phosphoric acid. The fibres were cured at 120° C. for 4 hours.

Paper handsheets were prepared as before from the disintegrated fibre (fibre length about 5 mm, diameter 12μ), and from mixtures of the fibre with groundwood pulp. The burst indices of the paper samples were as follows:

| % Groundwood | Burst Index |
|---|---|
| 0 | 0.20 |
| 40 | 0.45 |
| 90 | 0.90 |

The fibre showed good self-adhesive properties

EXAMPLE 9

650 parts of formalin and 237 parts of urea, as used in the previous example, were mixed with 16.0 parts of $Na_2HPO_3.5H_2O$ and refluxed for 30 minutes. Formic acid was added to reduce the pH to 4.85 and the mixture was further refluxed for 44 minutes. Caustic soda was then added to change the pH to 5.45, the resin was cooled to 50° C. and adjusted to pH 6.95. The resin was concentrated under vacuum, removing 355 parts of distillate.

A blend of equal parts of this resin with a conventional UF resin (Formaldehyde:urea ratio 1.95:1) was centrifugally spun as described in Example 6. Fibres as produced were of mean diameter 12μ after curing for 4 hours at 120° C. After reducing in length of about 4 mm, papers were prepared, as before, and demonstrated that the fibres showed the property of self-adhesion. Mixtures of the fibres with groundwood gave papers with the following properties.

| % Groundwood | Burst Index |
|---|---|
| 50 | 0.57 |
| 80 | 0.78 |
| 90 | 0.87 |

EXAMPLE 10

650 parts of formalin, and 237 parts of urea, as used in Example 9, were mixed and warmed to 40° C. 2.3 parts of $H_3BO_3$ and 14.2 parts of $Na_2B_4O_7.10\ H_2O$ were dissolved in the mixture which was then refluxed for 30 minutes (pH 8.05). Formic acid was added to bring the pH to 4.85 and the mixture refluxed for a further 43 minutes. Caustic soda solution was added to achieve a pH of 5.6, the solution was cooled to 50° C. and finally adjusted (with caustic soda solution) to pH 7.0. The resin was concentrated under vacuum to remove 345 parts of distillate.

Fibres were centrifugally spun as in Example 6. The catalyst solution used was 30% phosphoric acid. The fibres were cured at 120° C. for an hour and shortened to a length of about 3 mm. Papers were made as in Example 9. A paper containing 100% borate modified UF fibre was easily formed and showed good self-adhesion. Papers containing groundwood pulp had the following burst indices.

| % Groundwood | % Borate modified fibre | Burst Index |
|---|---|---|
| 50 | 50 | 0.75 |
| 80 | 20 | 0.85 |
| 90 | 10 | 0.89 |

We claim:
1. An amino-formaldehyde resin selected from the group consisting of urea-formaldehyde, melamine formaldehyde and mixtures thereof, the said resin being in fiber form and containing 0.2 to 15 moles of sulphite radicals per 100 moles of $—CH_2—$ derived from formaldehyde.

* * * * *